May 10, 1932.  L. R. CLAUSEN  1,858,000
COMBINATION HARVESTER THRESHER
Filed Sept. 18, 1929   2 Sheets-Sheet 1

Inventor
Leon R. Clausen,
By James A. Walsh
Attorney

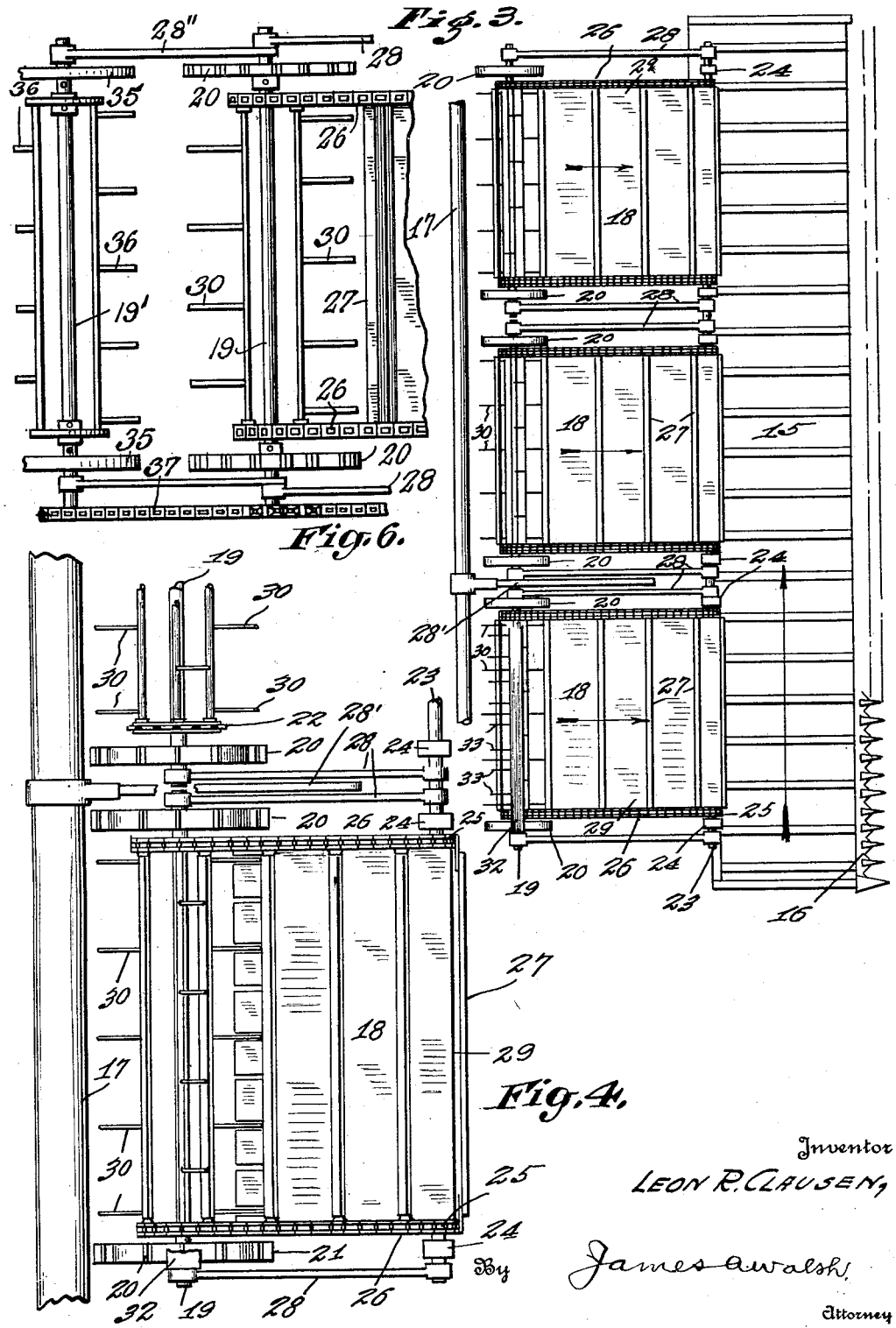

Patented May 10, 1932

1,858,000

UNITED STATES PATENT OFFICE

LEON R. CLAUSEN, OF RACINE, WISCONSIN, ASSIGNOR TO J. I. CASE COMPANY, OF RACINE, WISCONSIN, A CORPORATION

COMBINATION HARVESTER-THRESHER

Application filed September 18, 1929. Serial No. 393,353.

In harvesting small grain it is common practice to employ combination harvester-threshers, generally known as combines, which type of machine is drawn through the field and simultaneously cuts and threshes standing grain, such method being recognized as time and labor saving and therefore highly economical. However, conditions are at times quite unfavorable for harvesting, and so far as I am aware no combine is capable of gathering all the grain or substantially so, for the reason that a considerable percentage of the headed stalks have become broken off or bent over through attacks by insects, damage by storms and otherwise, so that the down heads of grain remain in the stubble close to or on the ground and are passed over ineffectively by the header during the operations of cutting and conveying the grain to the thresher. These broken stalks and down heads are scattered throughout the entire crop area, sometimes comprising as much as one-third of all the stalks, and, to the best of my knowledge, it has been impossible to gather these fallen heads from the stubble or ground by combines, reapers, binders or other machinery as at present constructed and operated. Under the conditions stated the grain grower suffers a material loss of the headed grain lying on the ground or sustained in the stubble, as ordinarily it is not practical or possible, after a moving harvesting machine has once traversed the field, to go back over the ground and endeavor to pick up the down grain, in fact such method would be highly objectionable for economical reasons as several operations would be required in the field for saving such grain. It will be apparent, therefore, that the loss of small grain from causes such as indicated is very material, and it is my object to prevent such loss by providing means in connection with a combine or other harvesting machine for combining the stubble and raking the ground over which the machine is passing, thus gathering and gleaning the fallen headed grain lying below the level of the cutting mechanisms, which I convey to the harvester platform of a combine to be delivered to the thresher with the grain being cut by the header, in which manner I am enabled to effectively gather and save grain which would otherwise be lost, and thresh the same with the grain being cut, thus saving substantially the entire crop in one operation of the machinery through a field of headed grain.

Figure 1:
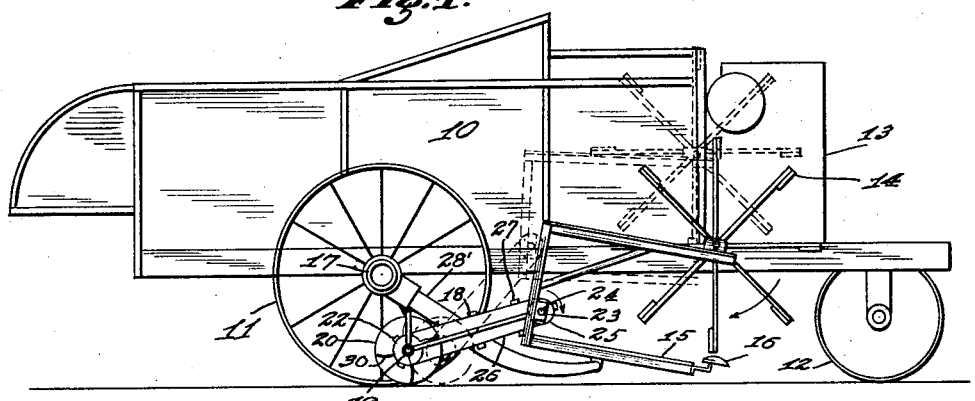
Figure 2:
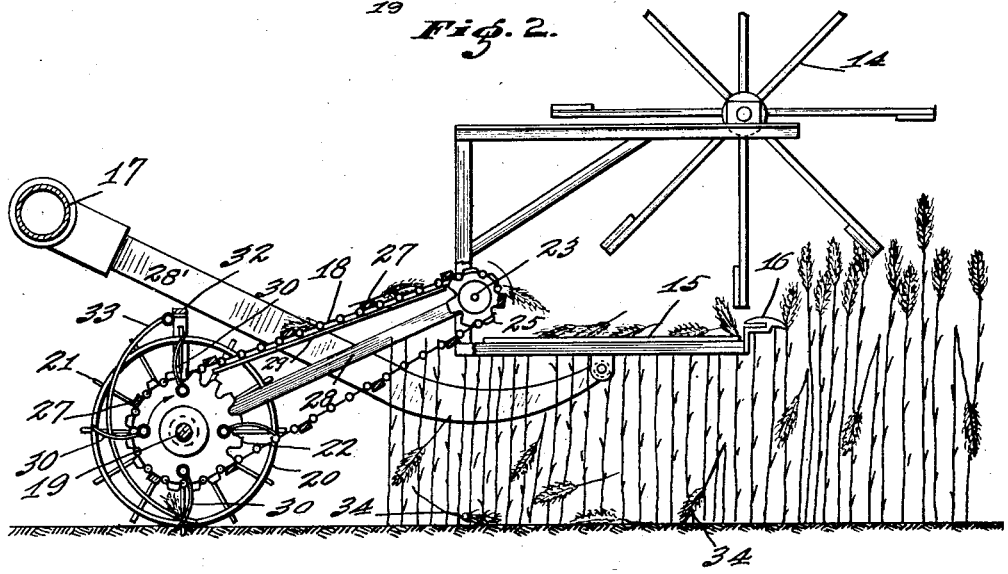
Figure 5:
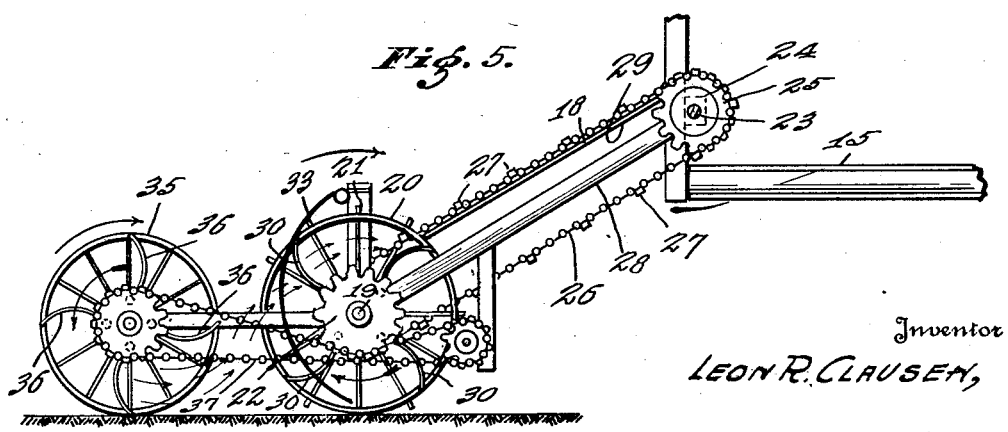

In the accompanying drawings, forming part hereof, Figure 1 is an elevation of a combination harvester-thresher with my improved gleaner attached to the harvester; Fig. 2, an enlarged end elevation of the harvester and gleaner the latter being partly in section, indicating the relation of said elements to standing grain; Fig. 3, a diagrammatic view showing a plurality of gleaners and their relation to a harvester, the latter being but partly shown; Fig. 4, a detail plan of the gleaner; Fig. 5 is a modified form of the gleaner, and Fig. 6 is a plan view of said modified form.

In the drawings the numeral 10 indicates the thresher element of a combine, supported by rear and front wheels 11, 12, respectively, and 13 an engine for operating the machinery. The header element may be of any desired construction, and which embodies a reel 14, platform 15, sickle 16, and other equipment of well known character.

I may employ one or more gleaners, 18, according to the size of the header, three being indicated in Fig. 3, and flexibly mounted so that they may move independently when traversing ground irregularities. The gleaner comprises an axle 19 which supports wheels 20 provided with lugs 21 for gripping the ground, and constitute a ground drive for the gleaner mechanisms, and upon which axle sprockets 22 are mounted to rotate therewith. Shafts 23 forming part of the upper end of the gleaner are secured, at 24, to the header, as indicated in Figs. 1 and 3, and upon which shafts sprockets or idlers 25 are mounted in alinement with sprockets 22 on the axle 19, which sprockets are connected by chains 26 forming part of a slatted carrier 27, which carrier travels over an imperforate flooring 29, as indicated in Fig. 5. At each side of the carrier links 28 are secured to the shafts 23 and axle 19, so connected to said shafts as to oscillate, and thereby permit the wheels 20 to follow ground irregularities. A shaft or axle 17 extending from the thresher and having suitable connections substantially as disclosed in the MacGregor Reissue Patent No. 17,368 dated July 6, 1926, supports an arm 28' for holding the header platform in position, which arm passes through the space formed by the links 28, as indicated in Fig. 4, and is shown as broken at the point where it passes over the axle 19 of the gleaner wheels, for purposes of clearness.

Axle 19 is equipped with a series of yielding tines 30, which rotate with the axle, and are so timed in their rotation in relation to the carrier 27 that there will be no contact or interference between these parts when the sprockets 22 rotate to actuate the carrier in the direction indicated. The carrier and its actuating parts may be of any desired arrangement and need not be more specifically described herein.

Upon a frame 32 I mount a series of curved fingers 33 spaced across the width of the gleaner, which act as a rake for thoroughly combing the stubble and arranging such down heads, as 34, in position to be picked up by the tines 30 and carried upwardly thereby and onto carrier 27 by which they are conveyed forwardly onto the header platform, where such material, as indicated, becomes part of the crop being cut to be conveyed therewith into the thresher, which operation is apparent from Fig. 3. In the fragmentary plan, Fig. 4, from which the fingers 33 and other parts have been omitted for purposes of clearness, the bearings 24 are more plainly shown, which are secured to the header, and in which the shafts 23 are supported, the ends of which sustain the upper carrier structure.

In the modified form shown in Figs. 5 and 6 I attach a second unit to that just described, by connecting members 28'' supporting shaft 19' upon which latter in any suitable manner I mount carrying wheels 35 free to turn about said shaft. Tines 36 are also mounted on the axle 19' to rotate therewith and in reverse direction to the wheels 35 and the tines 30 of the forward unit, by means of a sprocket-and-chain system 37 at one side of the implement, as indicated in Fig. 6. It will be noted that rake fingers, such as 33 in Fig. 2, are omitted from the modified form, so that any material which may be picked up by the tines 36 will be carried through the space between the forward and rear tines and onto said forward tines 30 to be thence carried to the harvester by the carrier 27 in the manner hereinbefore described. The direction of rotation of the wheels 20 and 35 are indicated by the arrows, as is also the reverse direction of the tines 36 through the action of the sprocket-and-chain system 37, which latter, as stated, rotates the tines 36 to throw material upwardly through the space between the two sets of rotating tines as indicated in Fig. 6.

I claim as my invention:

1. The combination, with the header element of a combination harvester-thresher, of a gleaner comprising supporting wheels, means for combing stubble, a conveyer, means for yieldingly connecting the gleaner to the header, and rotary means cooperating with the combing means for elevating grain to the conveyer to be carried by the latter and delivered onto the header.

2. The combination, with a header, of a gleaner comprising supporting and driving wheels, means for combing stubble, means for connecting the gleaner to the header, an endless conveyer on the gleaner, and rotary means cooperating with the combing means for elevating grain to the conveyer to be carried by the latter and delivered to the header, said wheels actuating the rotary means of the conveyer.

3. The combination, with a header, of a gleaner comprising wheels, combing fingers, rotating tines actuated by the wheels and cooperating with the fingers to elevate material from stubble, a conveyer supported by the wheels and cooperating with the tines for delivering material to a header, and means for yieldingly connecting the gleaner to a header whereby the gleaner may follow ground irregularities.

4. In a gleaner for headers, an axle, driving wheels mounted on the axle, tines on the axle and rotatable therewith, an endless conveyer, means for rotatably connecting the conveyer to the axle, and means for yieldingly connecting the conveyer to a header whereby the gleaner may move vertically to follow ground irregularities.

5. In a gleaner for headers, an axle, driving wheels mounted on the axle, a shaft connected to a header, a conveyer mounted on the axle and shaft, tines on the axle, and stubble combing fingers on the gleaner, said axle actuating the tines to cooperate with the fingers for elevating material from the stubble onto the conveyer to be delivered to a header.

6. The combination, with a header, of a gleaner, means for yieldingly connecting the gleaner to the header, means on the gleaner adapted to comb stubble, a conveyer, and means on the gleaner for picking up material from stubble and cooperating with the combing means to elevate such material onto the conveyer to be carried thereby to a header.

7. The combination, with a header, of an oscillating conveyer, and rotary means associated with the rear end of the conveyor for picking fallen grain heads from stubble and elevating them onto the conveyer to be carried thereby to the header.

8. The combination, with a header, of a conveyer, and a rotary pick-up device associated with the conveyer said device embodying tines adapted to elevate fallen grain heads from stubble and deliver them to the conveyer to be carried thereby to the header.

In testimony whereof I affix my signature.

LEON R. CLAUSEN.